United States Patent [19]

Kolich et al.

[11] Patent Number: 5,102,963
[45] Date of Patent: Apr. 7, 1992

[54] ACRYLATE CURED POLYPHOSPHAZENES

[75] Inventors: Charles H. Kolich; Suae-Chen Chang, both of Baton Rouge, La.

[73] Assignee: Ethyl Corporation, Richmond, Va.

[21] Appl. No.: 334,357

[22] Filed: Apr. 7, 1989

[51] Int. Cl.$^5$ .................. C08F 275/00; C08G 79/04
[52] U.S. Cl. ........................ 525/538; 528/69; 528/75; 528/399
[58] Field of Search ............ 525/538; 528/399

[56] References Cited

U.S. PATENT DOCUMENTS 3,844,983 10/1974 Reynard et al. ............... 525/538
4,816,532 3/1989 Chang ........................ 525/538

FOREIGN PATENT DOCUMENTS 0008794 3/1980 European Pat. Off. .......... 525/538

*Primary Examiner*—Melvyn I. Marquis
*Assistant Examiner*—Vasu S. Jagannathan
*Attorney, Agent, or Firm*—Richard J. Hammond; Richard L. Hansen

[57] ABSTRACT

Polyorganophosphazenes having at least some N-(acryloxyhydrocarbyl)ureidohydrocarbyloxy groups:

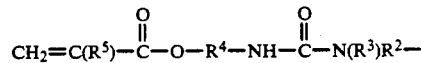

bonded to an oxygen substituted on at least some of the phosphorus atoms of the phosphazene chain. These compounds can be cross-linked by exposure to ultraviolet radiation.

42 Claims, No Drawings

ACRYLATE CURED POLYPHOSPHAZENES

BACKGROUND

Polyorganophosphazenes are polymers having a backbone of alternating phosphorus and nitrogen atoms and for this reason have been referred to as "inorganic polymers." Each phosphorus, however, carries two substituent groups which can be inorganic, e.g. chlorine, or organic, e.g. phenoxy. The polymers may be low molecular weight such as cyclic trimers, tetramers and the like or oligomers containing about 3-20 repeating —P=N— units. The more useful polymers are the high molecular weight open-chain polymers such as those described in U.S. Pat. No. 3,515,688; U.S. Pat. No. 3,702,833; U.S. Pat. No. 3,856,712 and U.S. Pat. No. 3,856,713. These polymers are soluble in solvents such as tetrahydrofuran (THF), cyclohexane, toluene, etc. but can be cured (i.e., cross-linked) to insoluble polymers by means such as sulfur vulcanization or free-radical (e.g., peroxide) catalysts. Curing is more readily accomplished if the soluble polymer contains some olefinically unsaturated groups such as ortho-allylphenoxy (e.g., U.S. Pat. No. 3,970,533; U.S. Pat. No. 3,972,841 and U.S. Pat. No. 4,116,785).

Reynard et al. U.S. Pat. No. 3,948,820 describe open-chain polyorganophosphazenes having hydroxy substituents which can be crosslinked, by reaction with organic diisocyanates, e.g., toluene diisocyanate, to form a urethane-type cross-link. Reynard et al. U.S. Pat. No. 4,006,125 describes similar polymers wherein the hydroxy-substituted polyorganophosphazene is reacted with an excess of organic polyisocyanate such that the polymer is not cross-linked but is substituted through a urethane-type bond with an isocyanate terminated side chain. Such polymers can be cured by a small amount of water such as is present in moist air.

Other phosphazenes having acrylate groups indirectly attached to the chain are described in copending application 180,098 and 171,129. In cross linking these, the unsaturation can be affected by UV irradiation or by addition of a polyacrylate ester followed by irradiation.

SUMMARY OF THE INVENTION

It has now been discovered that polyorganophosphazenes which have some N-(acryloxyhydrocarbyl)ureidohydrocarbyloxy substituents can be readily cured by exposure to ultraviolet radiation.

DESCRIPTION OF THE PREFERRED EMBODIMENTS

A preferred embodiment of the invention is a curable cyclic or linear polyorganophosphazene which comprises:

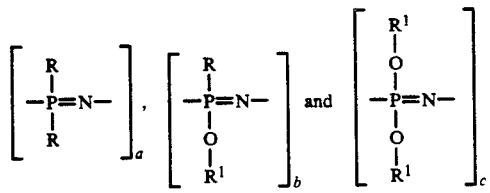

wherein R is a $C_1$ to $C_{12}$ linear or branched alkyl, cycloalkyl, aryl, substituted aryl, $C_1$ to $C_{12}$ linear or branched alkoxy, cycloalkoxy, aryloxy or substituted aryloxy or mixtures thereof and $R^1$ is a substituent having the formula:

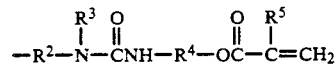

wherein $R^2$ and $R^4$ are $C_2$ to $C_{12}$ divalent alkylene or substituted alkylene $R^3$ is hydrogen, $C_1$ to $C_{12}$ linear or branched alkyl, cycloalkyl or aryl and $R^5$ is hydrogen or methyl and (a+b+c) is from about 3 to about 50,000. At least some of said units must have an $R^1$ substituent.

The uncured polyorganophosphazene may be cyclic or open chain. Cyclic polyorganophosphazenes contain from 3 up to 20 repeating (P=N) units. The most common cyclics are trimers and tetramers, especially trimers.

Open chain polyorganophosphazene can contain from about 3 up to 50,000 or more (P=N) units. The lower molecular weight polymers contain about 3-20 (P=N) units and are referred to as oligomers. These open chain polymers are mainly linear although some branching may occur. The polymers are not cross-linked and are soluble in solvents such as tetrahydrofuran, benzene, toluene, cyclohexane, dioxane, dimethoxyethane and the like.

Substituent groups represented by R can be linear or branched alkyl including methyl, ethyl, n-propyl, isopropyl, n-hexyl, 2-ethylhexyl, n-dodecyl, 2-chloroethyl, 2-fluoroethyl, phenethyl, benzyl, 2,2,2-trifluoroethyl, perfluoroethyl, 4,4,3,3,2,2-hexafluorobutyl, 2-nitroethyl, 2-ethoxyethyl and the like.

Likewise linear or branched cycloalkyl substituents may be bonded to phosphorus. Examples of these are cyclohexyl, cycloheptyl, cyclooctyl, cyclododecyl, 4-chlorocyclohexyl, 4-bromocyclohexyl, 4-fluorocyclohexyl 4-nitrocyclooctyl, 2-acetocyclohexyl, 4-acetoxycyclohexyl and the like.

Useful aryl and substituted aryl substituents are phenyl, tolyl, naphthyl, 4-ethylphenyl, 2-allylphenyl, 4-chlorophenyl, 4-trifluoromethylphenyl, 2-nitrophenyl, 4-acetoxyphenyl, 4-methoxyphenyl and the like.

The alkoxy, cycloalkoxy and aryloxy substituents are similar to the above except are bonded through oxygen to phosphorus. Some examples are methoxy, ethoxy, 2-methoxyethoxy, polyethoxyethoxycyclohexoxy, cyclooctyloxy, benzyloxy, 2,2,2-trifluoroethoxy, 4,4,3,3,2,2-hexafluorobutoxy, 4-ethylphenoxy, 2-allylphenoxy, 4-methoxyphenoxy and the like.

An especially useful class of polyorganophosphazenes are the polyaryloxyphosphazenes. Such polymers have phenoxy and/or substituted phenoxy substituted on phosphorus. An especially useful polyaryloxyphosphazene has a mixture of both phenoxy and alkylphenoxy substituents such as 30-70 mole percent phenoxy and 30-70 mole percent 4-ethyl phenoxy.

Another especially useful class of polyorganophosphazene has fluoroalkoxy substituents wherein the fluoroalkoxy groups are represented by the formula:

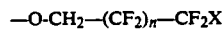

wherein n is zero or an integer from 1 to 15 and x is H or F. These are referred to as polyfluoroalkoxyphosphazene. They are illustrated by the groups trifluoroethoxy, 2,2,3,3,3-pentafluoropropoxy, 2,2,3,3,4,4,4-heptafluorobutoxy, 2,2,3,3-tetrafluoro propoxy, 2,2,3,3,4,4,5,5-octafluoropentoxy and the like. Mixtures of these groups may also be employed.

It really is not critical what the organo substituents on phosphorus are as long as there are at least some, sufficient to impart cure. These organo substituents are preferably N-(acryloxyhydrocarbyl)ureidohydrocarbyloxy substituents and have the formula:

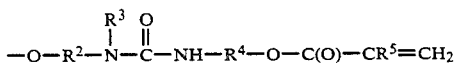

wherein $R^2$ and $R^4$ are divalent $C_1$ to $C_{12}$ alkylene or substituted alkylene, and $R^3$ is hydrogen, $C_1$ to $C_{12}$ linear or branched alkyl, cycloalkyl or aryl and $R^5$ is hydrogen or $CH_3$. From this it is apparent that the term "acryl" is used in a generic sense to mean both the acryl group, $-C(O)-CH=CH_2$, as well as the methacryl group, $-C(O)-C(CH_3)=CH_2$. The divalent alkylene group can be aliphatic, cycloaliphatic or aromatic, e.g.

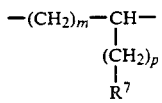

where m is an integer from 1 to 4, p is zero or an integer from 1 to 4 and $R^7$ is hydrogen or methyl. Some examples are: $-CH_2-CH_2-$, $-CH_2-CH(CH_3)-$, $-(CH_2)_{12}-$, 1,4-cyclohexylene, 1,4-phenylene and the like. The number of such groups is not critical as long as there are a sufficient number to impart the desired degree of cure when exposed to ultraviolet radiation. A useful range is about 0.1–50 mole percent of the total phosphorus substituent. The low molecular weight polymers, e.g. where n is about 3–10, preferably have about 33–50 mole percent of the phosphorus substituents as acrylate terminated groups whereas the high molecular weight polymers, e.g. where n is about 15,000 or higher require only about 0.1–1.0 mole percent acrylate terminated groups.

The arylate or methacrylate terminated groups may be introduced by first reacting polyphosphonitrilic chloride having the desired chain structure (i.e., cyclic or linear chain) and number of (P=N) units (i.e., 3–50,000 or more) with reagents to introduce the desired phosphorus substituents (e.g., sodium ethoxide, butyl magnesium bromide, phenyl magnesium bromide, sodium 2,2,2-trifluoroethoxide, sodium phenoxide, sodium p-ethylphenoxide and the like) in an amount which is not sufficient to react with all of the chlorine bound to phosphorus. Then the remaining chlorine can be reacted with a sodium aminohydrocarbyloxide such as sodium 2(ethylamino)ethoxide to introduce an aminoalkoxy group. Alternatively the amine terminated groups may be inserted first by reaction of the polyphosphonitrilic chloride with a sodium (or potassium) aminohydrocarbyloxide followed by reaction of the remaining chlorine atoms with a different nucleophile. The methods described in Reynard et al. U.S. Pat. No. 3,948,820 and U.S. Pat. No. 4,006,125, incorporated herein by reference, can be used to introduce the aminoalkyloxy or aminoaryloxy groups. The amine functional group can also be attached by a substituent exchange process involving a fluoroalkoxyphosphazene and the mono sodium salt of an aminoalcohol. For example:

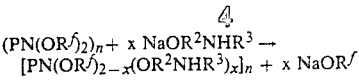

wherein $(OR^f)$ is a fluoroalkoxy group, such as $OCH_2(CF_2)_nCF_2X$ where n is zero or an integer from 1 to 15 and X is hydrogen or fluorine.

The acrylate or methacrylate function can be obtained by reacting the aminohydrocarbyloxy-substituted polyorganophosphazene with an acrylate or methacrylate ester of a hydroxyhydrocarbyl isocyanate such as methacryloxyethylisocyanate. These have the structure:

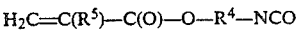

wherein $R^4$ and $R^5$ are as previously defined.

The reaction of the above isocyanate with the amine-containing polyorganophosphazene is promoted by the inclusion of a conventional polyurethane catalyst such as an organotin compound, e.g., dibutyltin dilaurate.

The resultant polyorganophosphazene having N-(acryloxy or methacryloxy hydrocarbyl) ureidohydrocarbyloxy substituents can be readily cross-linked or cured through its acrylate or methacrylate function by exposure to ultraviolet radiation. The degree of cure depends on the thickness of the material, the intensity of the ultraviolet radiation and the time of exposure. When using a conventional 500 watt mercury vapor lamp, thin films are cured in 0.5–10 minutes. Ultraviolet cure is promoted by including a small amount of benzophenone as a sensitizer. Tack of the cured product is reduced by including a small amount of an alkanol amine such as triethanol amine. The use of benzophenone and triethanol amine in acrylate cross-linking is conventional.

The preparation and curing of the N-(acryloxy or methacryloxyhydrocarbyloxy) ureidohydrocarbyloxy-substituted polyorganophosphazenes is shown in the following example.

EXAMPLE 1

An open-chain poly(dichlorophosphazene) having an approximate molecular weight of 2000 was used for the following reaction. An 838.0 g (7.23/n mole) portion of this low molecular weight $[PNCl_2]_n$ in 1831 g cyclohexane was added to a 5-gal reactor containing 10,704 g of a solution of 10.09 moles $NaOCH_2CF_3$ and 5.43 moles $NaOCH_2(CF_2CF_2)_xH$ in tetrahydrofuran. After refluxing for 6 hours acid was added to neutralize the mixture to a pH of 5–6. The reaction mass was then added to an excess of heptane ( 8 gal). After decanting the solvent from the precipitated solid, acetone was added to dissolve the polymer. This mixture was added to water to remove the NaCl by-product. The clear aqueous phase was decanted from the precipitated polymer, and the product was further purified by precipitations from acetone into water. solution of the polymer was dried over 3A molecular sieves and then pumped through a 7 micron filter to obtain 6062 g of clear yellow filtrate containing 1810.7 (80.5% yield) of poly[(fluoroalkoxy)-phosphazene]. The product had a chloride content of 0.28 wt% and a sodium level of 64 ppm. The intrinsic viscosity of the polymer was 0.13 dl/g (measured in THF) and the number average molecular weight in THF was 5400. The glass transition temperature for the polymer determined by differential scanning calorimetry was −66° C. Fluorine NMR indicated the polymer had a substituent composition of 66.5 mole% $OCH_2CF_3$ and 33.5 mole% $OCH_2(CF_2CF_2)_xH$. Phosphorus NMR showed a single peak at −7.18 ppm (rel. to 85% H₃PO₄) as expected for a randomly substituted polyphosphazene.

57.3 g (365.97 meq) portion of an isopropanol solution of sodium isopropoxide and 36.21 g (406.2 mmoles) of 2-(ethylamino)ethanol were combined and allowed to stand overnight.

To the above solution was added 1003.98 g (299.9 g of polymer) of the fluoro-polymer solution prepared as shown above. The clear, amber solution was heated to 80.C for 5 hours and the resulting solution added over 20 minutes to 7 liters deionized water using ice bath cooling to reduce the temperature of the precipitated polymer. A further 2.5 liters of water was then added and the mixture allowed to stand overnight. After centrifugation and several water washes (until pH of the wash liquid reached 6-7), the polymer was then dried under an infrared lamp for several hours. The resulting material was transferred in acetone to a rotary evaporator. After removal of the acetone and any residual water, an ethylaminoethoxy substituted phosphazene copolymer (205.8g) was isolated as a tacky brown glass. The polymer had an intrinsic viscosity of 0.17 dl/g (in THF) and a number average molecular weight in THF of 2900. NMR spectra (proton and fluorine) showed a substituent distribution of 64.7 mole% $OCH_2CF_3$, 32.6 mole% $OCH_2(CF_2CF_2)_xH$, and 2.7 mole% $OCH_2CH_2NHCH_2CH_3$.

A solution of 4.44 g (13.9 mmoles) of the above amine phosphazene copolymer dissolved in 2.67 g methylisobutyl ketone was divided into portions of (A) 4.249g and (B) 2.861 g (2.653 g and 1.702 g of polymer, respectively). To solution (A) was added 0.071 g (0.46 meq) of isocyanatoethylmethacrylate and the resulting mixture agitated for one hour. Benzophenone (0.265g, 1.45 mmole) and triethanolamine (0.127 g, 0.85 mmole). were then added. Sample B was treated with only 0.187 g (1.03 mmole) of benzophenone and 0.099 g (0.66 mmole) triethanolamine. After agitating both solutions for 20 minutes, portions of each were placed on glass slides. The solvent was allowed to evaporate (60 minutes) and the resulting material warmed with an infrared lam for 2 ½ hours to complete the evaporation of solvent. The polymer was a thick viscous transparent amber liquid.

The materials A and B prepared above were exposed to a water cooled, 550 watt Hanover medium pressure mercury lamp for 120 seconds at a distance of 3 centimeters. Sample A formed a cross-linked polymer as indicated by the resulting opaque film that was only partially soluble in THF. Sample B remained totally soluble in THF after the UV treatment.

As shown above, a further embodiment of the invention is a cured or cross-linked cyclic or linear chain polyorganophosphazene which, prior to cross-linking, contains 3-50,000 or more units having the structure:

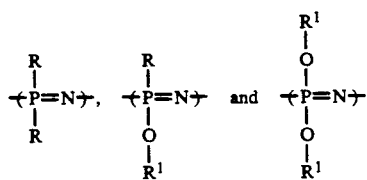

wherein R is $C_1$ to $C_{12}$ linear or branched alkyl, cycloalkyl, aryl, substituted aryl, $C_1$ to $C_{12}$ linear or branched alkoxy, cycloalkoxy, aryloxy, or substituted aryloxy or mixtures thereof and $R^1$ is:

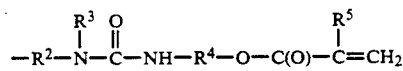

wherein $R^2$ and $R^4$ are divalent $C_1$ to $C_{12}$ alkylene or aryl substituted alkylene, $R^3$ is hydrogen, $C_1$ to $C_{12}$ linear or branched alkyl, cycloalkyl or aryl and $R^5$ is hydrogen or methyl and at least some, preferably 0.1–50 mole percent, of the substituents bonded to phosphorus are R' groups.

Another way of describing this same embodiment is as a cross-linked polyorganophosphazene wherein the cross-link has the structure:

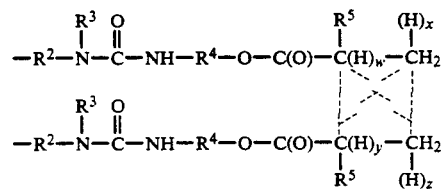

where $R^2$, $R^3$ $R^4$ and $R^5$ are as deferred and w, x, y and z are 0 or 1 and $w+x=1$ and $y+z=1$ and the dashed lines represent possible direct bonds between carbon atoms and only one such direct bond is present in each of the cross-linking structures and is between the 2 carbon atoms which have a zero value for w, x, y or z indicating the absence of the (H) on such carbon atoms. The cross-linking structures need not all be the same.

The cured polyorganophosphazenes can be used as potting compounds for electrical devices. They are especially useful as coating compositions for a wide range of substrates.

What is claimed:

1. A curable phosphazene copolymer containing randomly distributed units of the formula:

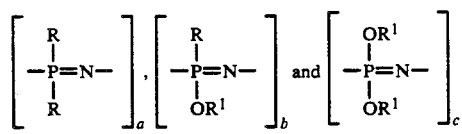

wherein R is $C_1$ to $C_{12}$ linear or branched alkyl, cycloalkyl, aryl, or substituted aryl, $C_1$ to $C_{12}$ linear or branched alkoxy, cycloalkoxy, aryloxy or substituted aryloxy, or mixtures thereof; $R^1$ is the group:

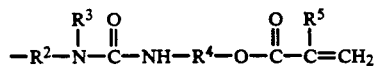

wherein $R^2$ and $R^4$ are $C_1$ to $C_{12}$ divalent alkylene or aryl substituted alkylene, $R^3$ is hydrogen, $C_1$ to $C_{12}$ linear or branched alkyl, cycloalkyl or aryl, $R^5$ is hydrogen or methyl and (a+b+c) is from about 3 to about 50,000.

2. A polyorganophosphazene of claim 1 wherein $R^2$ is a divalent aliphatic hydrocarbon group containing 2-12 carbon atoms.

3. A polyorganophosphazene of claim 2 wherein $R^4$ is a divalent aliphatic hydrocarbon group containing 2-12 carbon atoms.

4. A polyorganophosphazene of claim 3 wherein $R^5$ is methyl.

5. A polyorganophosphazene of claim 4 wherein R is a substituted or unsubstituted alkyl or aryl or mixture thereof.

6. A polyorganophosphazene of claim 5 wherein R is mainly fluoroalkyl groups or mixture of said groups having the formula:

$$-CH_2-(CF_2)_n-CF_2X$$

wherein n is zero or an integer from 1-15 and X is hydrogen or fluorine.

7. A polyorganophosphazene of claim 5 wherein R is mainly substituted or unsubstituted phenyl or mixtures thereof.

8. A polyorganophosphazene of claim 4 wherein $R^2$ is a group having the structure:

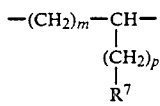

wherein m is an integer from 1 to 4, p is zero or an integer from 1-4 and $R^7$ is hydrogen or methyl.

9. A polyorganophosphazene of claim 8 wherein $R^4$ is $-CH_2-CH_2-$.

10. A polyorganophosphazene of claim 8 wherein m is 2, p is zero and $R^6$ is methyl.

11. A polyorganophosphazene of claim 10 wherein $R^4$ is $-CH_2-CH_2-$.

12. A polyorganophosphazene of claim 8 wherein R is a substituted or unsubstituted alkyl or aryl or mixture thereof.

13. A polyorganophosphazene of claim 11 wherein R is mainly substituted or unsubstituted phenyl or mixtures thereof.

14. A polyorganophosphazene of claim 11 wherein R is mainly fluoroalkyl groups or mixtures of said groups having the formula:

$$-O-CH_2-(CF_2)_n-CF_2X$$

wherein n is zero or an integer from 1-15 and X is hydrogen or

15. A cross-linked polyorganophosphazene of claim 1.

16. A cross-linked polyorganophosphazene of claim 15 wherein said cross-link has the structure:

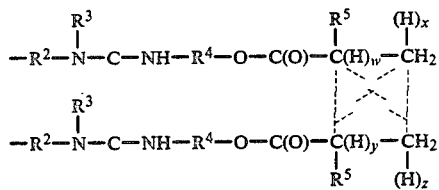

where $R^2$, $R^3$, $R^4$ and $R^5$ are as in claim 1 and w, x, y and z are 0 or 1 and w+x=1 and y+z=1 and the dashed lines represent possible direct bonds between carbon atoms and only one such direct bond is present in each of said cross-link structures in said polyorganophosphazene and is between the 2 carbon atoms which have a zero value for w, x, y or z indicating the absence of the (H) on such carbon atoms.

17. A cross-linked polyorganophosphazene of claim 16 wherein $R^2$ is a divalent aliphatic hydrocarbon group containing 2-12 carbon atoms.

18. A cross-linked polyorganophosphazene of claim 17 wherein $R^3$ is a divalent aliphatic hydrocarbon group containing 2-12 carbon atoms.

19. A cross-linked polyorganophosphazene of claim 18 wherein $R^5$ is methyl.

20. A cross-linked polyorganophosphazene of claim 19 wherein R is a substituted or unsubstituted alkyl or aryl or mixture thereof.

21. A cross-linked polyorganophosphazene of claim 20 wherein R is mainly fluoroalkyl groups or mixture of said groups having the formula:

$$-O-CH_2-(CF_2)_n-CF_2X$$

wherein n is zero or an integer from 1-15 and X is hydrogen or

22. A cross-linked polyorganophosphazene of claim 20 wherein R is mainly substituted or unsubstituted phenyl or mixtures thereof.

23. A cross-linked polyorganophosphazene of claim 19 wherein $R^2$ is a group having the structure:

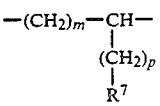

wherein m is an integer from 1 to 4 and p is zero or an integer from 1-4 and R6 is hydrogen or methyl.

24. A cross-linked polyorganophosphazene of claim 23 wherein $R^4$ is $-CH_2-CH_2-$.

25. A cross-linked polyorganophosphazene of claim 23 wherein m is 2, p is zero and $R^7$ is methyl.

26. A cross-linked polyorganophosphazene of claim 25 wherein $R^4$ is $-CH_2-CH_2-$.

27. A cross-linked polyorganophosphazene of claim 23 wherein R is a substituted or unsubstituted alkyl or aryl or mixture thereof.

28. A cross-linked polyorganophosphazene of claim 26 wherein R is mainly fluoroalkyl groups or mixtures of said groups having the formula:

$$-O-CH_2-(CF_2)_n-CF_2X$$

wherein n is zero or an integer from 1-15 and X is hydrogen or

29. A method for preparing a curable phosphazene copolymer containing randomly distributed units of the formula:

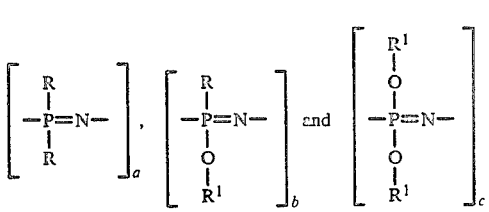

where R is $C_1$ to $C_{12}$ linear or branched alkyl, cycloalkyl, aryl or substituted aryl, $C_1$ to $C_{12}$ linear or branched alkoxy, cycloalkoxy, aryloxy, substituted aryloxy or mixtures thereof; $R^1$ the group:

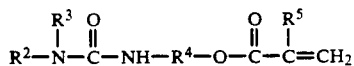

where $R^2$ and $R^4$ are $C_1$ to $C_{12}$ divalent alkylene or aryl substituted alkylene, $R^3$ is hydrogen, $C_1$ to $C_{12}$ linear or branched alkyl, cycloalkyl or aryl, $R^5$ is hydrogen or methyl and $(a+b+c)$ is from about 3 to about 50,000 said method comprising reacting a phosphazene copolymer of the formula:

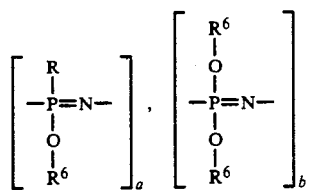

where R, a, b and c are as previously defined and $R^6$ is the group:

where $R^2$ and $R^3$ are as previously defined, with a compound of the formula:

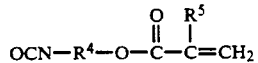

where $R^4$ and $R^5$ are as previously defined.

30. The method of claim 29 wherein $R^2$ is a divalent aliphatic hydrocarbon group containing 2-12 carbon atoms.

31. The method of claim 29 wherein $R^4$ is a divalent aliphatic hydrocarbon group containing 2-12 carbon atoms.

32. The method of claim 29 wherein $R^5$ is methyl.

33. The method of claim 29 wherein R is a substituted or unsubstituted alkyl or aryl or mixture thereof.

34. The method of claim 29 wherein R is mainly fluoroalkyl groups or mixture of said groups having the formula:

$$-CH_2-(CF_2)_n-CF_2X$$

wherein n is zero or an integer from 1-15 and X is hydrogen or fluorine.

35. The method of claim 29 wherein R is mainly substituted or unsubstituted phenyl or mixtures thereof.

36. The method of claim 29 wherein $R^2$ is a group having the structure:

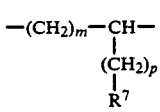

wherein m is an integer from 1 to 4, p is zero or an integer from 1-4 and $R^7$ is hydrogen or methyl.

37. The method of claim 29 wherein $R^4$ is —CH$_2$—CH$_2$—.

38. The method of claim 29 wherein m is 2, p is zero and $R^6$ is methyl.

39. The method of claim 29 wherein $R^4$ is —CH$_2$—CH$_2$—.

40. The method of claim 29 wherein R is a substituted or unsubstituted alkyl or aryl or mixture thereof.

41. The method of claim 29 wherein R is mainly substituted or unsubstituted phenyl or mixtures thereof.

42. The method of claim 29 wherein R is mainly fluoroalkyl groups or mixtures of said groups having the formula:

$$-O-CH_2-(CF_2)_n-CF_2X$$

wherein n is zero or an integer from 1-15 and X is hydrogen or fluorine.

* * * * *